United States Patent [19]
Platten et al.

[11] Patent Number: 5,684,594
[45] Date of Patent: Nov. 4, 1997

[54] OBJECT FIXTURING IN INTERFEROMETER

[75] Inventors: James E. Platten, Penfield; Richard S. Hordin, Fairport, both of N.Y.

[73] Assignee: Tropel Corporation, Fairport, N.Y.

[21] Appl. No.: 634,218

[22] Filed: Apr. 18, 1996

[51] Int. Cl.$^6$ .................................................. G01B 9/02
[52] U.S. Cl. ........................... 356/363; 356/305; 356/354
[58] Field of Search ............................... 356/345, 354, 356/356, 346, 363, 305

[56] References Cited

U.S. PATENT DOCUMENTS

| | | | |
|---|---|---|---|
| 4,844,614 | 7/1989 | Henderson et al. | 356/346 |
| 5,530,547 | 6/1996 | Arnold | 356/354 |

FOREIGN PATENT DOCUMENTS 106769  7/1974  Germany.

OTHER PUBLICATIONS

"Grazing incidence interferometry applied to the measurement of cylindrical surfaces" by Thomas Dresel et al., Optical Engineering, Dec. 1995, vol. 34, No. 12, pp. 3531–3535.

*Primary Examiner*—Frank G. Font
*Assistant Examiner*—Robert Kim
*Attorney, Agent, or Firm*—Eugene Stephens & Associates

[57] ABSTRACT

An object fixturing system applies to an interferometer having a pair of diffraction gratings arranged to produce and recombine test and reference beams. The fixturing system positions an object between the diffraction gratings so that a test beam is incident on a surface of the object at a grazing incidence angle. A positioning fixture engages the object and a reference surface of the interferometer in moving the object to a measurement position on a window platform that transmits the test and reference beams. The fixture is then removed for a simultaneous measurement of an entire surface of the object, which can be clamped in place if necessary by a clamping window that also transmits the test and reference beams.

32 Claims, 3 Drawing Sheets

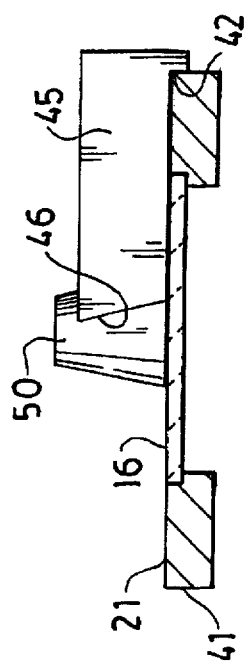
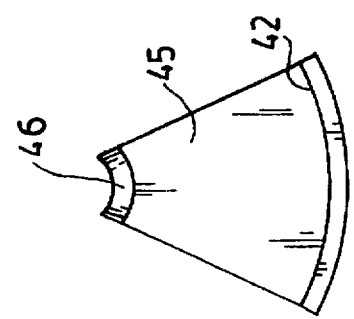
FIG.6
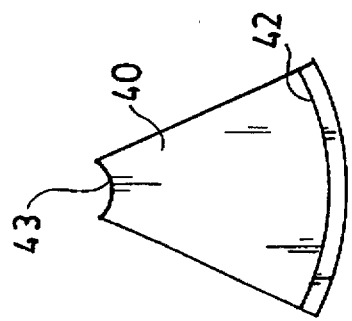
FIG.4
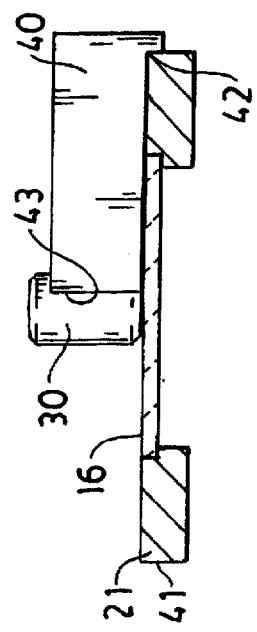
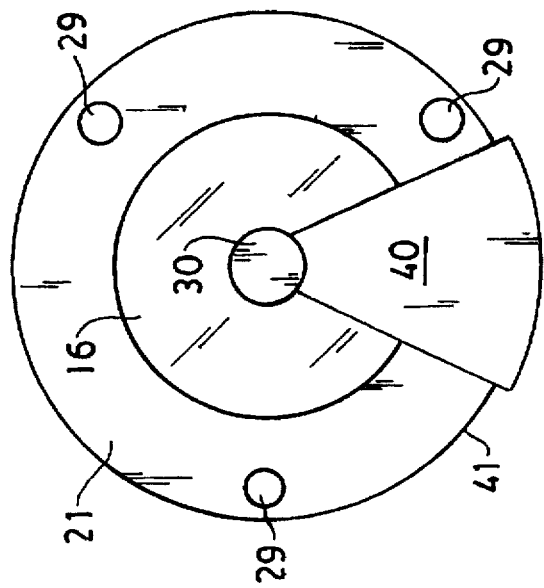

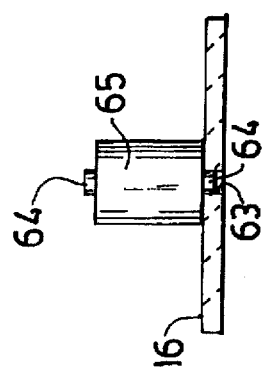
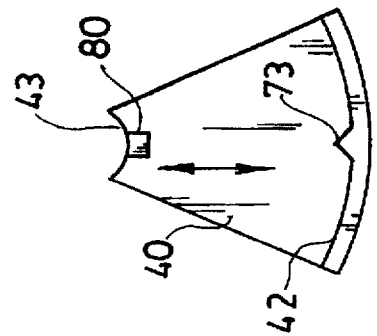
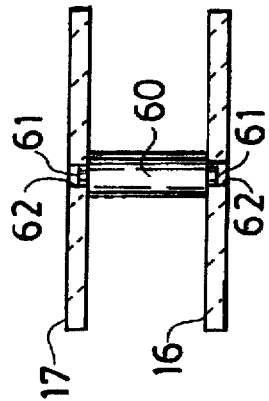
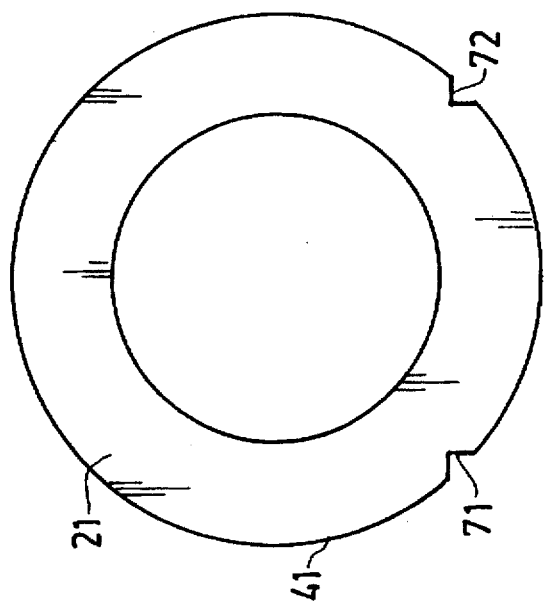
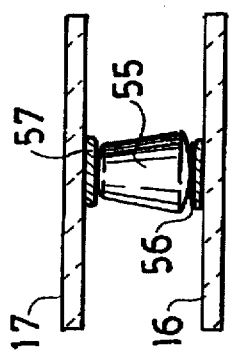
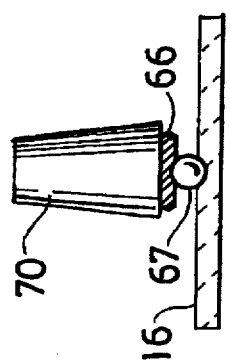
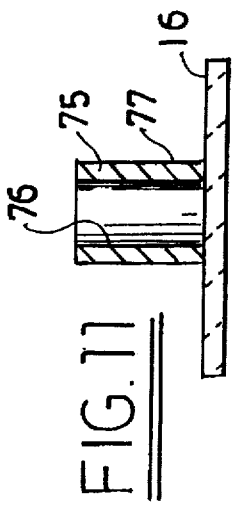

OBJECT FIXTURING IN INTERFEROMETER

TECHNICAL FIELD

Interferometers that measure the surface of an object positioned between a pair of diffraction gratings arranged to separate and recombine test and reference beams.

BACKGROUND

Interferometers using a pair of diffraction gratings arranged on an optical axis can separate and recombine test and reference beams so that a test beam can be incident on an object surface to measure that surface. The arrangement works readily for cylindrical and conical surfaces and can also be applied to other surfaces that depart from cylindrical or conical configurations. The object to be measured is positioned between the diffraction gratings so that the test beam is incident on the object surface at a grazing angle; and for object surfaces of revolution, which are most easily measured in such interferometers, the axis of the object surface is positioned on the optical axis of the diffraction gratings.

An operator of such an interferometer may need to place a succession of similar objects into the same measurement position so that a number of objects can be measured. It is also desirable for objects to be placed quickly and accurately into the measurement position so that measurements can be made as rapidly as possible. This is especially important when interferometers of this type measure an entire surface of an object simultaneously in one brief operation so that the time required for positioning objects for measurement becomes a significant portion of the total time required for a series of measurements.

SUMMARY OF THE INVENTION

We have devised an object-fixturing system that enables an operator to successively place objects rapidly into the same measuring position within the interferometer. Our system accommodates different sizes and shapes of objects and different ways of holding objects in place, once positioned. It aims at speeding up the process of positioning objects for measurement and improving the accuracy of object positioning. It also does this compatibly with the requirements of the interferometer.

Our object-fixturing system applies to an interferometer that has a pair of diffraction gratings arranged to produce and recombine test and reference beams. An object to be measured is positioned between the diffraction gratings so that a test beam is incident on a surface of the object and a reference beam passes by the object. This allows an entire surface of the object to be measured by a single interference pattern.

We use a fixture that can move in and out of engagement with a reference surface of the interferometer so that the fixture can return repeatedly to a known position. The fixture has an object-positioning surface that can engage and position an object in a measurement location within the interferometer. Object positioning occurs accurately when the object engages the positioning surface of the fixture and the fixture engages the reference surface of the interferometer. This allows a succession of objects of the same nominal size to be rapidly placed in the same measurement position by repeatedly deploying the fixture.

A preferred way of accomplishing this is with an object supporting platform arranged movably between the diffraction gratings. The object platform has a window that transmits test and reference beams and supports the object for measurement. The window platform is mounted on a stage that is movable to adjust the tilt of a plane in which the stage moves in X and Y directions. This movement allows an object positioned on the movable platform to be brought accurately into alignment with the optical axis of the diffraction gratings, by observing the interference patterns. Once a fixture-positioned object is properly aligned with the optical axis, then a succession of similar objects can be placed in the same position by reusing the fixture. The window platform can provide the reference surface for the fixture, and the fixture can provide a positioning surface for the object while both the object and the fixture are supported on the window platform. Objects that cannot stand freely without support are clamped in the measurement position. This can be done by a clamping window that is vertically adjustable and can be lowered to engage the top of a supported object.

DRAWINGS

FIG. 2 is a schematic side view of a window platform, positioning fixture, and object arranged according to the invention.

FIG. 3 is a schematic plan view of the window platform, object, and positioning fixture of FIG. 2.

FIG. 4 is a schematic bottom view of the positioning fixture of FIG. 2.

FIG. 5 is a schematic side view, similar to the view of FIG. 2, showing a conical object and a corresponding positioning fixture arranged relative to a window platform.

FIG. 6 is a schematic bottom view of the positioning fixture of FIG. 5.

FIGS. 7 and 8 are schematic side views of a pair of windows arranged for clamping objects between them in ways similar to the arrangement shown in FIG. 1.

Figure 1:
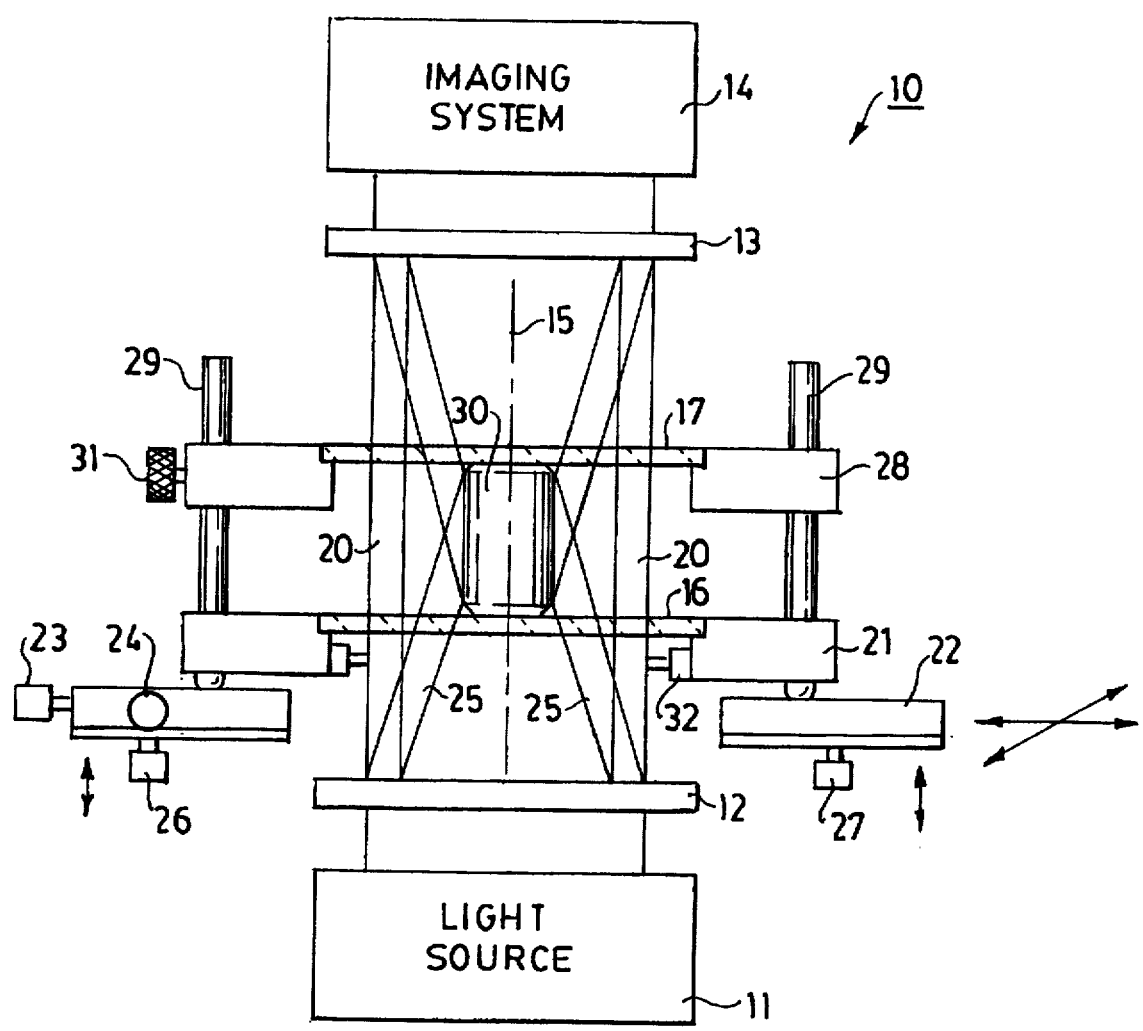
FIG. 1 is a schematic side view of a diffraction grating interferometer provided with the inventive object-fixturing system.

FIGS. 9–11 schematically show support windows arranged for holding different objects for measurement.

FIG. 12 schematically shows a window platform having two different fixture-locating regions.

FIG. 13 schematically shows a positioning fixture having a key that fits the two recesses of the window platform of FIG. 12.

DETAILED DESCRIPTION

An object-measuring interferometer 10 of the type used with our fixture system is systematically shown in FIG. 1. A source 11 of preferably monochromatic, collimated light is directed through a pair of diffraction gratings 12 and 13 arranged on an optical axis 15 shown as a broken line. For the simple illustrated case, each diffraction grating 12 and 13 is formed with concentric circular lines that diffract transmitted light into a reference beam 20 and a test beam 25. The reference beam 20 is a zero order beam that passes aside of an object 30 to be measured, and the test beam 25 is preferably a first order beam that is incident on a surface of object 30 at a grazing incidence angle. Test beam 25 reflects off the surface of object 30 and is recombined with reference beam 20 at diffraction grating 13. This produces an interference pattern that is viewed by imaging system 14 so that the surface of object 30 can be measured.

In practice, circumstances can be more complicated. Both positive and negative first order beams can occur; a zero order beam can be repressed; second order beams can become involved; the gratings can be blazed, given different pitches, and made in different configurations; and the surface of object 30 can depart from cylindrical or conical. The problem of fixturing objects 30 into a measurement position between diffraction gratings 12 and 13 remains similar, though, regardless of optical variations.

Object 30 is supported between gratings 12 and 13 on a window 16 that transmits the reference and test beams. Window 16 is supported by window platform 21 that is preferably movable, for reasons explained below. Platform 21 includes an adjustable aperture 32 that is preferably an iris device for adjusting the diameter of the light transmitted through grating 12.

Window platform 21 is mounted on a stage 22 that permits the desired movement. Schematically illustrated movement devices 23–27 provide movement in X and Y directions and tilt adjustment of a plane in which the X and Y motions occur. Movement controllers 23–27 can be micrometer-type manual devices or motor driven and computer controlled.

A clamping window 17 is sometimes used to engage an upper portion of object 30. This is important for measuring objects 30 that are unstable or are unable for some reason to stand reliably upright. Clamping can also be used for objects oriented in a horizontal or other non-vertical position. Window 17 is supported on a clamping platform 28 that is adjustable vertically on guide rods 29 and can be held in an elevated position by set screw 31. Many other variations are possible for movement of clamping platform 28. The basic requirement is to elevate platform 28 while changing objects 30, and lower platform 28 so that clamping window 17 engages a positioned object 30 for measurement. The weight of window 17 is normally sufficient for clamping, although other clamping force can be applied. Window 17 also transmits the test and reference beams to upper diffraction grating 13.

A fixture 40 for positioning object 30 on window 16 in alignment with optical axis 15 is shown in FIGS. 2–4. A circular periphery of window platform 21 forms a reference surface 41 that fixture 40 engages with a surface 42. Fixture 40 can be slid on and off window platform 21 to bring its surface 42 into and out of engagement with reference surface 41 and the periphery of window platform 21.

Fixture 40 also has a positioning surface or edge 43 that engages object 30. A cylindrical or conical surface of object 30 can engage positioning surface 43 of fixture 40 along two lines or four points, but many other alternatives are possible.

Fixture 40 can be a single piece of material, as schematically illustrated, or can be an assembly of several parts. It can also have many shapes and can engage objects with positioning surfaces, edges, or points having different configurations. It can also engage an interferometer reference surface in a variety of ways, including lines, points, and keys. Many different forms can be substituted for the simple circular reference surface 41 illustrated for window platform 21, and the shape adopted for an interferometer reference surface will affect the shape of fixture 40 and its engagement surface 42 that moves into contact with a reference surface.

Objects 30 can be somewhat barrel shaped or have surfaces of other configurations that depart from cylindrical or conical. Such variations can be accommodated by different shaped positioning surfaces 43 on fixtures 40. A single interferometer can have a variety of fixtures 40 of different dimensions and configurations for positioning different shaped objects. An example of this is illustrated in FIGS. 5 and 6 where a fixture 45 has a conical shaped positioning surface 46 for engaging and positioning the correspondingly conical surface of an object 50 supported on window platform 21.

FIG. 7 schematically shows a clamping arrangement for an object 55 that does not stand stably upright. Object 55 has rounded ends so that it needs to be positioned upright as well as aligned with the optical axis of the interferometer. A fixture 45, such as illustrated in FIG. 6, can have a positioning surface 46 shaped to engage object 55 and hold it in an accurately upright position on window 16 where object 55 is positioned on supporting pad 56. Then, upper window 17 is lowered into clamping engagement with the upper end of object 55, which is engaged by a clamping pad 57 on the underside of clamping window 17.

Another example of an object 60 that benefits from clamping is schematically shown in FIG. 8. Object 60 has end projections 61 that are lodged in holes or recesses 62 formed in supporting window 16 and clamping window 17. A fixture 40 or 45 can aid in positioning object 60 so that projections 61 fit quickly and reliably into receiving openings 62.

FIG. 9 schematically shows an object 65 that has end projections 64 but also stands stably upright. Objects 65 can be positioned on window 16 by inserting an end projection 64 into a hole or recess 63 in window 16. FIGS. 7–9 illustrate the possibility of using different windows in platforms 21 and 28 and giving windows and fixtures different configurations for accommodating differently shaped objects.

Supporting window 16 can also be provided with a magnet 66 for holding an object 70, and a magnet 66 can be arranged in many ways at or above the upper surface of window 16. In the embodiment schematically illustrated in FIG. 10, magnet 66 is mounted on a small universal joint or ball joint 67 that is frictionally stiff enough to hold a position into which it is adjusted. This allows object 70 to be positioned accurately on magnet 66 and adjusted to an upright position by joint 67. Depending on the circumstances, object 70 can be measured as supported by magnet 66 or can be clamped in place by an upper window 17 such as illustrated in FIGS. 7 and 8. A fixture 45 such as illustrated in FIG. 6 can be used for engaging a conical surface of object 70 for such positioning. Magnet 66, whether mounted on joint 67 or on the surface of window 16, provides holding power and movement resistance so that fixturing of objects into a measurement position is quick and reliable. Objects supported on a magnet are less likely to be dislodged from a measurement position by withdrawal of a positioning fixture or a finger of an operator.

FIG. 11 schematically illustrates the fact that an object 75 can have an internal surface 76 to be measured, instead of, or in addition to, an external surface 77. The positioning of object 75 on window 16, with the aid of fixture 40, is done in the same way regardless of whether an inside or outside surface is being measured.

FIGS. 12 and 13 schematically illustrate locating notches or recesses 71 and 72 formed in the reference surface periphery 41 of window platform 21. These are engaged by projections or keys 73 extending from the engagement surface 42 of fixture 40. This allows two positions for fixture 40 on window platform 21, to accommodate right-handed and left-handed operators of the interferometer. Although object positioning might differ slightly between the two positions of fixture 40, if the same position is used repeatedly, objects of the same size will be consistently positioned.

FIG. 13 also illustrates a magnet 80 arranged on fixture 40 adjacent positioning surface 43 for magnetically engaging an object to be positioned. Use of magnet 80 saves an operator from holding an object against fixture positioning surface 43 by finger pressure. An object held by magnet 80 against positioning surface 43 can be moved into a measurement position by fixture 40 and then clamped by upper window 70 before fixture 40 is withdrawn. Alternatively, magnet 80 can be movable within fixture 40, as indicated by the double-headed arrow, to apply and then withdraw magnetic holding power. An object can be positioned while magnet 80 is adjacent positioning surface 43, and then magnet 80 can be withdrawn from positioning surface 43 so that fixture 40 can be removed from the interferometer without moving the positioned object. Many other possible uses for magnets can involve window receivers for objects and fixtures for positioning objects.

Assuming that a number of objects with the same nominal size are to be measured in sequence, an operator using our fixturing system would proceed as follows. A fixture 40 having a positioning surface 43 that fits or is compatible with the objects to be positioned would be selected for use, and the first object would be positioned on window 16. This would be done by moving fixture 40 into engagement with a reference surface while holding the object against positioning surface 43, either magnetically or by finger pressure. If a fixture of proper dimensions has been selected, this should place the object near the center of window platform 21 and near optical axis 15 of interferometer 10. If the object needs to be clamped in position, window clamp 17 would be lowered to engage a top of the object. If the object has end projections or otherwise benefits from a special receiver on window 16, this is preselected by mounting a suitable window on platform 21 and possibly another suitable window on clamping platform 28 in interferometer 10.

Once the selected object is positioned and the selected fixture 40 is withdrawn, stage 22 is adjusted to align the object with optical axis 15. This can be done by manually moving adjustment devices 23–27 while observing a pattern of fringes produced by imaging system 14. It can also be done by computer control of motor-driven adjustment devices that are responsive to computer analysis of an interferogram formed in imaging system 14. Adjustable aperture 32 may also be set at this time to exclude any unnecessary illumination transmitted through diffraction grating 12.

After the object is adjusted into alignment with optical axis 15, a measurement of its surface is made quickly by optical analysis of the interferogram, and the measured object is removed from the interferometer. This requires unclamping the object, if a clamp was necessary to hold the object in an upright position.

The same fixture that was previously used is then redeployed for positioning a second object for a second measurement. Since similar objects in a measurement series have the same nominal size, reuse of the fixture brings the second object accurately to the same position that the first one occupied, without requiring any readjustment of stage 22. The second object is then quickly measured and removed, and the process is repeated until all the objects in the sequence have been measured. Fixture positioning of subsequent objects for measurement proceeds quickly after the first object is brought into adjusted alignment with the optical axis of the interferometer. Repeated use of the same positioning fixture ensures that each subsequent object in a series occupies the same position as the first one.

When a different size or configuration of object is to be measured, the process is repeated. Any adjustments in window 16 or 17 are predetermined, a proper fixture is selected, the initial object is positioned and properly aligned, and then subsequent objects are accurately brought to the same position by reusing the same fixture.

Since interferometer 10 can complete a measurement of a properly positioned object in a few seconds, our fixturing system appreciably speeds up the process of measuring a sequence of objects of the same size. It also does this with simple and inexpensive components that do not interfere with the mechanical or optical operation of the interferometer.

We claim:

1. In an interferometer having a pair of diffraction gratings arranged to produce and recombine test and reference beams, the improvement comprising:
   a. a movable stage positioned between the diffraction gratings in the path of the test and reference beams;
   b. a window platform mounted on the movable stage and having a window through which the test and reference beams pass;
   c. a fixture having a locating surface engageable with a reference surface of the window platform;
   d. the fixture having a positioning surface to engage and position an object in a measurement position on the window platform where the test beam is incident on the object; and
   e. the fixture being removable from the interferometer to leave the object positioned on the window platform for measurement of a surface of the object.

2. The improvement of claim 1 wherein the positioning surface of the fixture engages the object surface being measured.

3. The improvement of claim 1 including an object receiver arranged on the platform for holding the object in a fixtured position.

4. The improvement of claim 3 wherein the object receiver includes a magnet.

5. The improvement of claim 3 wherein the object receiver includes a universal joint.

6. The improvement of claim 3 wherein the object receiver includes a recess.

7. The improvement of claim 1 including a clamp for engaging an end of the object opposite the end supported on the window platform.

8. The improvement of claim 7 wherein the clamp has a window through which the test and reference beams pass.

9. The improvement of claim 1 wherein the window platform includes an adjustable aperture for limiting the size of the test and reference beams.

10. The improvement of claim 1 wherein the reference surface of the window platform is below a plane supporting the object, and the positioning surface of the fixture is above the plane supporting the object.

11. A method of fixturing objects in a measurement position between diffraction gratings producing and recombining test and reference beams in an interferometer, the method comprising:
   a. using a window platform on a movable stage for supporting the object between the diffraction gratings of the interferometer;
   b. using a fixture for engaging the object and the window platform so as to position the object in a measurement position on an optical axis of the interferometer in a path of the test beam;
   c. removing and replacing objects of the same size by positioning the objects with the fixture; and d. moving the fixture out of engagement with each object in a measuring position during measurement of surfaces of the objects.

12. The method of claim 11 including moving the fixture and object with the fixture engaging the window platform and the object moving to the measurement position on the optical axis and then withdrawing the fixture from the interferometer to leave the object in the measurement position.

13. The method of claim 11 including using an object receiver on the window platform to support the object in the measurement position.

14. The method of claim 13 including using a magnet in the object receiver.

15. The method of claim 11 including clamping the object in the measurement position and unclamping the object for removal from the interferometer.

16. The method of claim 15 including magnetically holding the object to the fixture during positioning of the object and removing the fixture from the interferometer after clamping.

17. A combination of interferometer and fixture for positioning objects in the interferometer, the combination comprising:
   a. a reference surface on the interferometer engageable by the fixture;
   b. the fixture having a positioning surface for engaging an object to be positioned in the interferometer;
   c. the fixture being supported by the interferometer in engagement with the reference surface while engaging the object so that the object is positioned in a predetermined location in the interferometer;
   d. the object being supported by the interferometer in the predetermined location during a measurement of a surface of the object after the fixture is withdrawn from the interferometer; and
   e. the support for the object in the predetermined location being arranged between diffraction gratings of the interferometer so that a test beam is incident on a surface of the object.

18. The combination of claim 17 wherein the reference surface is on a window platform that is movable between the diffraction gratings.

19. The combination of claim 18 wherein the window platform is mounted on a movable stage between the diffraction gratings.

20. The combination of claim 18 wherein the object is supported on a window of the window platform.

21. The combination of claim 17 wherein the reference surface is positioned below the plane of support for the object, and the positioning surface is above the plane for supporting the object.

22. The combination of claim 17 including a magnet for supporting the object in the predetermined location.

23. The combination of claim 22 including a universal joint supporting the magnet.

24. The combination of claim 17 including a clamp for holding the object in the predetermined location.

25. An interferometer comprising:
   a. a pair of diffraction gratings arranged on an optical axis so that test and reference beams are formed in a region between the diffraction gratings;
   b. an object measuring position located on the optical axis between the diffraction gratings;
   c. a fixture supportable on the interferometer so that an engagement surface of the fixture engages a reference surface of the interferometer;
   d. the fixture having a positioning surface engaging a surface of an object so that when the fixture engages the reference surface and the object engages the positioning surface, the object is positioned on the optical axis; and
   e. the fixture being removable from the engagement surface to leave the object positioned on the optical axis for measurement.

26. The interferometer of claim 25 including a platform for supporting the object on a window arranged for transmitting the test and reference beams.

27. The interferometer of claim 26 including a movable stage arranged between the diffraction gratings, and the platform being mounted on the movable stage.

28. The interferometer of claim 25 wherein the reference surface is below the plane of a surface supporting the object, and the positioning surface is above the plane supporting the object.

29. The interferometer of claim 25 including an object receiver arranged at the object measuring position.

30. The interferometer of claim 29 wherein the object receiver includes a magnet.

31. The interferometer of claim 25 including a clamp for clamping the object in the measuring position.

32. The interferometer of claim 31 wherein the clamp includes a window for transmitting the test and reference beams.

* * * * *